May 16, 1933.  A. M. ALLEN  1,908,806
KITCHEN UTENSIL
Filed Sept. 2, 1931   2 Sheets-Sheet 1
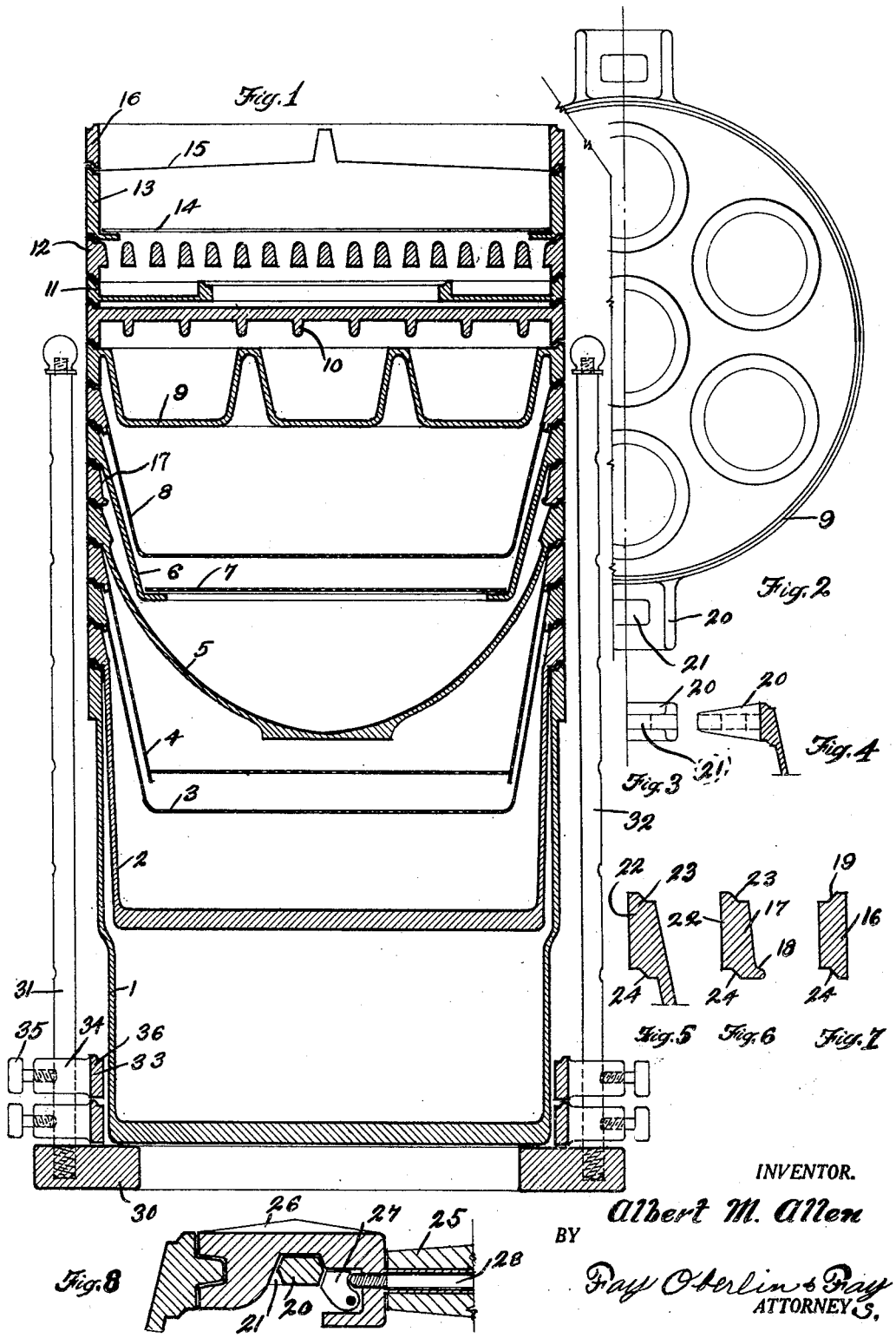
INVENTOR.
Albert M. Allen
BY
Pay Oberlin & Pay
ATTORNEYS.

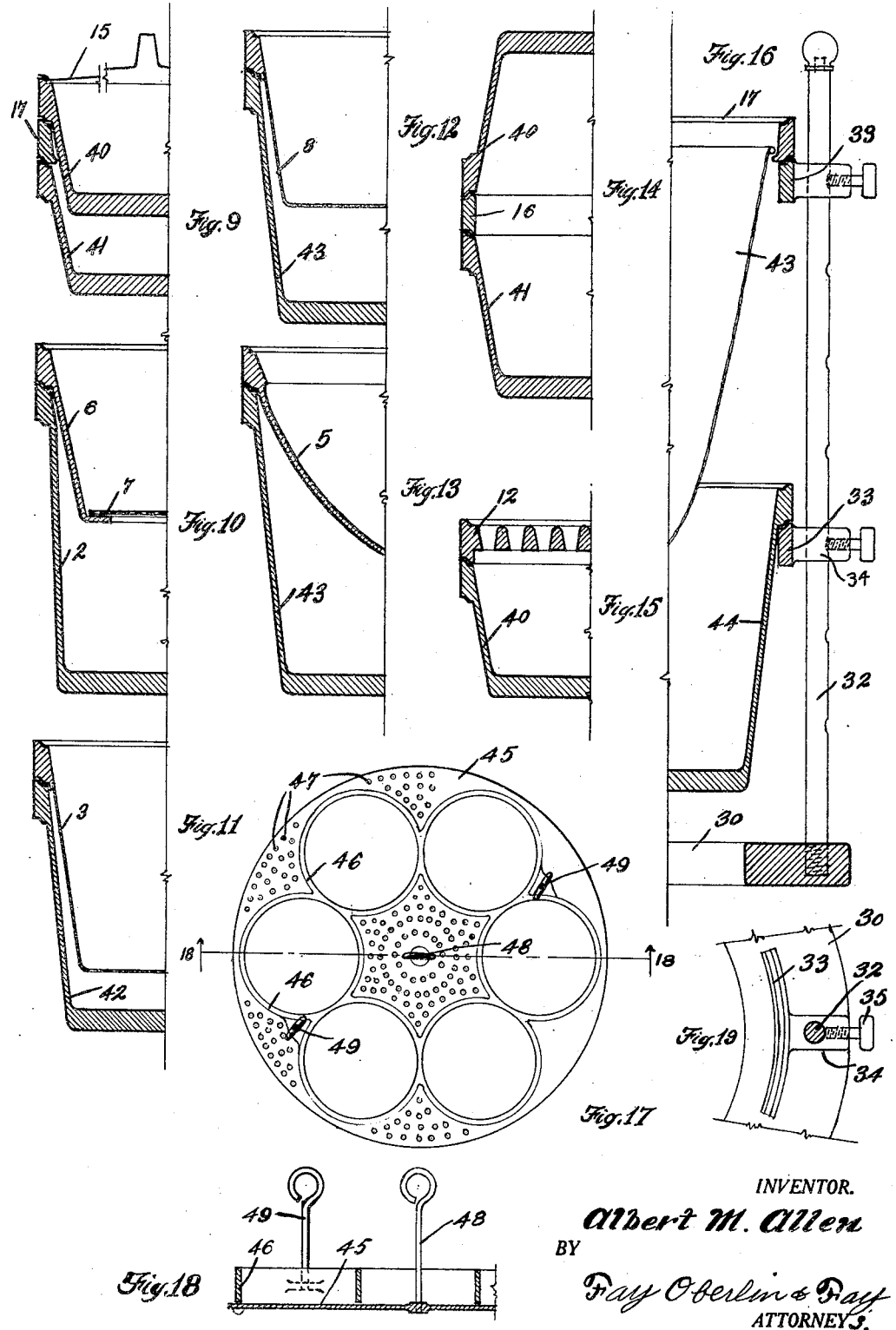

Patented May 16, 1933

1,908,806

UNITED STATES PATENT OFFICE

ALBERT M. ALLEN, OF LAKEWOOD, OHIO

KITCHEN UTENSIL

Application filed September 2, 1931. Serial No. 560,755.

The present invention relating as indicated to kitchen utensils, pertains more particularly to a novel type of construction for such utensils whereby they may be conveniently superimposed or nested or packed one within the other, and any two or more of which may be used in combination for various cooking operations in order to eliminate many single purpose utensils.

It is a further object of my invention to provide means for supporting one utensil over another at various heights and in various combinations. Another object involved in the construction of my herein described device is to provide a removable handle means for conveniently handling hot utensils. To the accomplishment of the foregoing and related ends, said invention, then, consists of the means hereinafter fully described and particularly pointed out in the claims.

The annexed drawings and following description set forth in detail certain mechanism embodying the invention, such disclosed means constituting, however, but one of various mechanical forms in which the principle of the invention may be used.

In said annexed drawings:

Fig. 1 is an elevational sectional view of a plurality of utensils constructed according to the principles of my invention and arranged in superimposed and nested relationship; Fig. 2 is a fragmentary plan view of one of the utensils employed in my assembly, and illustrating the laterally projecting ears for the removable handle; Figs. 3 and 4 are side elevational views of the ears adapted to receive the removable handle; Fig. 5 is an enlarged fragmentary sectional view of the marginal flange of the utensils; Fig. 6 is a cross-section of the bag or spacer ring used in the assembly; Fig. 7 is a cross-section of the adapter ring; Fig. 8 is an enlarged sectional view showing the manner in which the removable handle is attached to the utensils; Figs. 9 to 16 inclusive are fragmentary transverse sectional views illustrating the various combinations of utensils; Fig. 17 is a plan view of the perforated plate and ring group; Fig. 18 is a section taken substantially upon line 18—18 of Fig. 17; and Fig. 19 is a fragmentary plan view showing the construction of the utensil supporting rack.

Referring more particularly to Fig. 1, the principle of my invention contemplates the provision of a plurality of vari-formed utensils in conveniently superimposed and nested relationship; wherein I have shown the large kettle 1, the smaller kettle 2, the woven basket 3, the colander 4, mixing bowl 5, an open bottomed utensil 6, with the removable perforated bottom 7 for which may be substituted an unperforated bottom or variously formed bottoms. A form of strainer 8, the muffin pan 9, griddle 10, an adapter plate 11, a broiling grill 12, baking dish 13 with the removable bottom 14, the lid 15, the adapter ring 16, and bag or spacer ring 17.

As shown in Fig. 5, each one of the utensils possesses an upper marginal flange 22 having an inner shoulder 23 and a lower, outer shoulder 24. The shoulders 23 and 24 are made in complementary form and are of uniform dimensions, so that when the utensils are placed in superimposed or nested position or in combination with each other, these shoulders will form a reasonably tight joint which will center one utensil over the other and prevent tendency toward lateral displacement. Other contours of the contact surfaces which will produce the desired results may be used. In Fig. 6 there is shown the bag or space ring 17 which has the inner extension 18 for the reception of a separate circular ring to which a fabric straining bag may be attached. Fig. 7 shows the adapter ring 16 having the lower shoulder 24 and the upper reversely formed shoulder 19, and is for the purpose of retaining in position two of the utensils when they are used in inverted combination.

The purpose of the adapter plate 11 is to permit the combination of a utensil of larger diameter with one of a smaller diameter, since my invention also contemplates the use of various groups of nested utensils of varying dimensions and capacity, as household and kitchen requirements are found to individually demand.

As illustrated in Figs. 2, 3 and 4, a pair of laterally projecting ears 20 are positioned upon the utensil flanges 22. These projecting ears 20 as shown to best advantage in Fig. 8, have a central recess 21 for the reception of a removable handle 25, which carries a bifurcated lug 26 adapted to fit into the opening 21. A pivoted cam 27, actuated by the threaded rod 28 is for the purpose of retaining the removable handle 25 in locked engagement with the projecting ear 20.

In Figs. 9 to 15 inclusive, the bag or spacer ring is shown only once in Fig. 9, whereas it may be used in the other combinations if desired, its purpose being in these cases to increase the space below the bottom of the upper utensil. In Fig. 9 the pans 40 and 41 are combined with the bag or spacer ring 17 and the lid 15, in order to form a steam or water bath. In Fig. 10 the sieve 6 is combined with the kettle 2 in order to form a convenient utensil for any appropriate straining operation. In order to form a deep frier, the woven basket 3 may be combined with the kettle 42, as shown in Fig. 11. Fig. 12 shows the combination of the strainer 8 and any other larger depth utensil 43. In the bowl combination, as shown in Fig. 13, the mixing bowl 5 may be used in conjunction with another container of suitable depth in which hot or cold water may be placed as required by the operation. In order to form a roaster, the two pans 40 and 41 may be placed in inverted combination with the adapter ring 16 placed therebetween as shown in Fig. 14. Fig. 15 shows the broiler grill 12 placed over the pan 40 which is for the purpose of collecting the drippings. As shown in Fig. 16, the bag ring 17 carrying the straining bag 43 may be held at a suitable height above the collecting kettle 44, in order to effect a drip straining operation.

Directing attention to Figs. 1, 16, and 19, the construction of the supporting rack which may be used to support any of the utensils in desired combinations, is as follows. The annular base 30 carries the two vertical support rods 31 and 32. The supporting rods in turn adjustably carry the supporting rings 33 which have the laterally extending lugs 34 and the set screws 35, so that the rings may be secured at any point vertically on the rods. The rings 33 have a shoulder 36 corresponding to the lower shoulder 24 on the flange of the utensils and any utensil may be set on the rings. The rings 33 may be made in the form of a complete circle or in the form of a segment as shown in Fig. 19.

In Figs. 17 and 18 there is illustrated a perforated plate 45 and the ring group 46. The plate 45 has a plurality of small holes or perforations 47 positioned outside the rings. A suitable lifting handle 48 may be attached to the perforated plate and similar handles 49 may be attached to the ring group 46. The latter described plate and rings may be placed in the interior of the large kettle 1 when the utensils are nested. The plate 45 and ring group 46 may be placed in any utensil with sufficient water in the latter in order to serve as a poacher. The ring group 46 without the plate 45 can be placed in any utensil and used as a frying or baking form.

It will thus be seen that I have provided a simple and unique assembly for cooking utensils whereby they may be conveniently and attractively packed or stored, and in which various combinations of any two or more of the utensils may be utilized to perform a multitude of cooking operations.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A plurality of nested cooking utensils, including kettles, bowls, strainers, grills, baking pans, and the like, a marginal flange on each of said utensils, said flanges being of equal dimensions and identical contour, and a shoulder on the upper and lower edge of each flange, the upper shoulder on one of said flanges being complementary to the lower shoulder on another of said flanges.

2. A plurality of nested cooking utensils, including kettles, bowls, strainers, grills, baking pans, and the like, a marginal flange on each of said utensils, said flanges being of equal dimensions and identical contour, a shoulder on the upper and lower edge of each flange, the upper shoulder on one of said flanges being complementary to the lower shoulder on another of said flanges, and an adapter ring having a flange of equal dimensions to said utensil flanges, a shoulder on the upper and lower edges of said adapter ring flange, the shoulder on said upper edge being inverted with respect to the shoulder on said lower edge.

3. A plurality of nested cooking utensils, including kettles, bowls, strainers, grills, baking pans, and the like, a marginal flange on each of said utensils, said flanges being of equal dimensions and identical contour, a shoulder on the upper and lower edge of each flange, the upper shoulder on one of said flanges being complementary to the lower shoulder on another of said flanges, and a socket on the outer side of each of said flanges for the reception of a removable handle.

4. A plurality of nested cooking utensils, including kettles, bowls, strainers, grills, baking pans, and the like, a marginal flange on each of said utensils, said flanges being of equal dimensions and identical contour, a shoulder on the upper and lower edge of each flange, the upper shoulder on one of said flanges being complementary to the lower shoulder on another of said flanges, an adapter ring having a flange of equal dimensions to said utensil flanges, a shoulder on the upper and lower edges of said adapted ring flange, the shoulder on said upper edge being inverted with respect to the shoulder on said lower edge, and a socket on the outer side of each of said utensil flanges for the reception of a removable handle.

5. A plurality of nested cooking utensils, including kettles, bowls, strainers, grills, baking pans, and the like, a marginal flange on each of said utensils, said flanges being of equal dimensions and identical contour, a shoulder on the upper and lower edge of each flange, the upper shoulder on one of said flanges being complementary to the lower shoulder on another of said flanges, a vertical supporting rack, brackets adjustable on said rack, and projecting portions on said brackets having a shoulder adapted to interfit with the lower edge of said utensil flanges.

Signed by me this 31st day of August 1931.

ALBERT M. ALLEN.